United States Patent [19]
McGlashen

[11] 3,853,663
[45] Dec. 10, 1974

[54] APPLICATION OF LIQUID COATINGS

[75] Inventor: James N. McGlashen, Winstanley, near Wigan, England

[73] Assignee: Dunlop Holdings Limited, London, England

[22] Filed: Apr. 24, 1974

[21] Appl. No.: 463,504

Related U.S. Application Data
[62] Division of Ser. No. 204,262, Dec. 2, 1971, Pat. No. 3,823,687.

[30] Foreign Application Priority Data
Dec. 16, 1970 Great Britain.................... 59827/70

[52] U.S. Cl.................... 156/304, 117/94, 117/120, 156/509
[51] Int. Cl............................................. B29c 27/10
[58] Field of Search ........... 156/509, 502, 349, 304; 117/94, 113, 114 R, 114 A, 114 B, 114 C; 118/421; 228/1, 37

[56] References Cited
UNITED STATES PATENTS

| | | | |
|---|---|---|---|
| 1,258,071 | 3/1918 | Winter | 118/421 X |
| 1,746,416 | 2/1930 | Butler | 118/421 UX |
| 1,988,955 | 1/1935 | Nehmert | 118/421 X |
| 2,260,282 | 10/1941 | Grint | 118/421 X |
| 2,578,627 | 12/1954 | Brent | 118/421 |
| 2,771,049 | 11/1956 | Fish | 118/421 UX |
| 3,084,650 | 4/1963 | Johns | 118/429 X |
| 3,383,906 | 5/1968 | Gillet | 118/421 X |
| 3,618,566 | 11/1971 | Walker et al. | 118/429 |
| 3,691,988 | 9/1972 | Clarke | 118/421 X |

Primary Examiner—Morris Kaplan
Attorney, Agent, or Firm—Stevens, Davis, Miller & Mosher

[57] ABSTRACT

A method and apparatus for the accurate coating of liquids, particularly adhesives, onto selected areas of the surface of an article. The article is positioned above the surface of the liquid in correspondence with a tool below the liquid surface. The tool corresponds in shape to the selected areas of the article. Raising the tool without breaking the surface of the liquid causes the liquid above it to rise and contact the article in the selected areas only, of which the following is a specification. Two hemispheres so coated on the rims thereof, are joined.

9 Claims, 12 Drawing Figures

APPLICATION OF LIQUID COATINGS

This is a division of application Ser. No. 204,262, filed Dec. 2, 1971, now Pat. No. 3,823,687.

This invention relates to a method of applying a liquid coating to a surface. It is particularly concerned with the application of adhesive in liquid form, for example rubber solutions, but is not limited thereto.

In one aspect therefore the invention provides a method of applying liquid to selected areas of an article, in which the article is positioned above the surface of the liquid so that it is in correspondence with a tool positioned beneath the surface of the liquid, the tool being shaped to correspond with the selected areas of the article, and the tool is raised so that it does not break the surface of the liquid but causes the liquid above the tool to rise, thereby bringing the liquid into contact with the selected areas of the article.

Apparatus for practicing the method of the invention provides means for applying liquid to selected areas of an article which comprises a bath to contain the liquid, a tool positioned to lie within the bath beneath the surface of the liquid, means to position the article above the bath in correspondence with the tool and means to raise the tool towards the article without breaking the surface of the liquid, the tool being shaped to correspond with the selected areas of the article.

The means to position the article above the bath may conveniently be, for example, a pair of guide rails running across and above the bath. The article can be carried in a suitably shaped jig, the jig having a pair of arms to locate on and run along the guide rails.

As indicated above, the invention is particularly concerned with the application of adhesives. It is not, however, limited thereto and can equally well be applied to a diversity of liquids, for example the printing of patterns with inks and other liquid printing media and to the application of such liquids as molten solder. However, for convenience the invention will be more specifically described with reference to the application of adhesives.

Many articles are made by adhering together their component pieces and this is frequently done by means of glues, rubber solutions, solvents and like liquid adhesives. The application of liquid adhesives whether done automatically, semi-automatically or manually is apt to be an inexact technique resulting in either a deficiency of adhesive in some areas or a surplus of unwanted adhesive in other areas or both. In many cases the application of an excess of adhesive in an area to be coated, or of adhesive in areas not desired to be coated, can be very inconvenient and may well hinder the subsequent steps in the production of the article in question. A deficiency of adhesive in certain areas may also, of course, result in unsatisfactory bonding in the product.

The present invention mitigates this problem in that it allows a controlled application to be achieved with greatly reduced risk of a surplus or deficiency of adhesive, or other liquid, being applied in any area.

In order to obtain the best results it is preferable to keep the liquid at a constant level in the bath. This can be achieved by any convenient means, for example recirculating means and a weir. The bath can conveniently be provided with a weir at each end and pumping means to return excess liquid carried over the weir back into the bath. By keeping the level of the liquid in the bath constant it is possible to keep the travel of the tool constant and similarly to keep the required position of the article above the bath in the actual "coating position" constant. Thus the apparatus can be set to accurate working limits and can be run without requiring the continuous adjustments which would be necessary if the level of the liquid was allowed to fall. Recirculating of the liquid has an added advantage where a liquid such as an adhesive is used in that it prevents "skinning over" of the surface of the liquid.

The height by which the liquid can be raised by the tool depends on the speed of raising the tool, the viscosity of the liquid and the area of the tool. The heights are of course relatively small. For example, when using a latex-based adhesive having a viscosity of 150 to 160 seconds when measured by the Ford Viscosity Cup No. 4, a suitable height to position the article to be coated above the surface of the liquid is about one eighth of an inch. The method has been found to work satisfactorily using water but in general, as the viscosity of the liquid increases, the effect of the invention is more marked.

In a convenient embodiment of the invention the tool has a rest position just below the surface of the liquid, for example one eighth of an inch below the surface. When the article to be coated is in position above the tool the latter is depressed and then returned or allowed to return to its rest position. This causes the liquid immediately above the tool to rise momentarily above the general level of the liquid surface and thereby to contact and coat the article as desired. This movement of the tool can be achieved for example by means of a lever and spring arrangement whereby the tool is depressed by means of the lever and is then returned to its rest position by action of the spring. Alternatively, the tool may have a rest position somewhat further below the surface of the liquid and it may then be raised to a position just below the surface of the liquid and then returned to its rest position. At its highest point the tool will have raised the liquid immediately above it sufficiently for the liquid to contact the article to be coated. A similar lever and spring system can be used to achieve this movement of the tool.

As indicated above, the height of the arcticle above the liquid, the position and the speed of movement of the tool will vary with the type of liquid used, but it is a reasonably straightforward matter to determine the optimum conditions for any particular system. Similarly the optimum width of tool to coat any particular article will vary with the viscosity of the liquid. In general, the less viscous the liquid the wider the tool must be, but again optimum conditions can be readily determined for any system.

The invention is particularly useful in the application of adhesive to the edges of hemispherical half-shells which are then to be joined together to form hollow spheres. For example, in the manufacture of the hollow rubber cores of tennis balls and squash balls the cores are conventionally made by first forming two partly cured rubber half-shells, dipping the rims of the half-shells into a suitable adhesive, sticking the two halves together and then completing the cure in a mould. The adhesive application stage is messy and prone to inaccuracy. As shown below with reference to FIG. 1, the adhesive is liable to coat part of the outer walls of the core halves. This makes subsequent handling more difficult in addition to being wasteful.

Accordingly, in a further aspect the invention provides a method of applying adhesive to the rim of a hemispherical half-shell, in which the half-shell is positioned pole uppermost above a bath of the adhesive in correspondence with an annulus positioned beneath the surface of the adhesive, the annulus being shaped to correspond with the rim of the half-shell, the annulus is raised so that it does not break through the surface of the adhesive but causes the adhesive above the annulus to rise, thereby bringing the adhesive into contact with the rim of the half-shell.

The invention also provides a method of making a hollow rubber core for a tennis ball, squash ball or the like, in which the core is first formed as two partially cured hemispherical half-shells, the rim of each half-shell is coated with adhesive by the aforesaid method, the two halves are then brought together and the cure is completed.

In coating the rim of a half-shell it is not essential to use an annulus as the tool; for example, a disc can be used. Where a disc is used, the liquid may coat partway up the inside wall of the half-shell but the outside wall can still be left liquid-free. Thus if it is not important in any particular article that the inside be free of liquid, a disc can equally well be used instead of an annulus.

When coating the rim of an article such as a hemispherical half-shell, there is a tendency for a bubble of the liquid to form across the mouth of the half-shell. This bubble will eventually burst and may leave a splash of liquid on the inside wall. Again, for many articles this may be unimportant but, if it is desired to keep the inside wall liquid-free, the following technique can be used. This entails introducing a vent pipe from the atmosphere into the air volume enclosed by the article being coated and the liquid. Bubble formation across the mouth of the article is thereby prevented. This venting technique, will not, of course, be necessary where open-ended articles, for example tubes, are being coated since such articles are "self-vented."

One further useful advantage of the method of the invention is that, as the tool never breaks through the surface of the liquid in normal operation, there will be no build-up of oxidized, skinned or otherwise degraded liquid on the tool.

Yet another useful advantage of the method of the invention results from the clean, accurate coating which is achieved. As indicated above, it is now possible to mechanically coat with adhesive only those areas of the component parts of an article which are desired to be stuck together. This enables an improved means of joining two rim-coated half-shells to be utilized.

Basically this improved joining means comprises fitting the rim-coated half-shells into opposite ends of a tube so that their adhesive-coated rims are facing, the two shells are then pressed together in the tube until their rims are pressed into abutment and are thereby joined. This technique is a yet further aspect of the present invention. It will be appreciated that this joining technique is only practical for continuous production if the outer walls of the half-shells are substantially free from adhesive.

Various embodiments of the invention are illustrated in the accompanying drawings in which.

Figure 1:
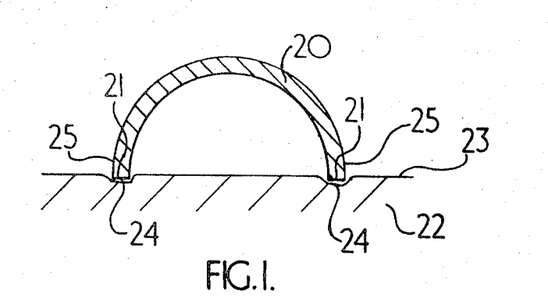
FIG. 1 is a sectional representation of a conventional dipping technique.

In FIG. 1 a hemisphere 20 is shown having a liquid 22, e.g. adhesive, applied to its rim 21 by a conventional dipping technique. Rim 21 is dipped into the surface 23 of the liquid causing an annular depression 24 to be formed. The rim is then removed from contact with the liquid. The surface tension of the liquid is broken in the areas of depression 24 and the liquid tends to flow partway up the walls 25 of the hemisphere as indicated.

Figure 2:
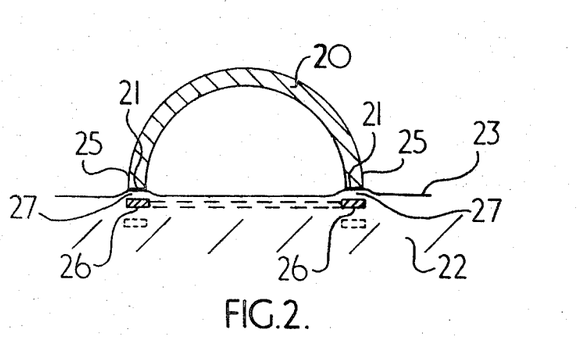
FIG. 2 is a similar representation of the technique of the present invention.

In FIG. 2, the rim 21 of hemisphere 20 is coated with liquid 22 using the method of the present invention. An annulus 26 is positioned beneath the surface 23 of the liquid, the annulus being of mean diameter equal to the mean diameter of the rim of the hemisphere. (By 'mean diameter' is meant the average external and internal diameters). The hemisphere is positioned with its rim 21 just above the surface of the liquid so that it is in correspondence with the annulus. The annulus is then raised from its initial position shown in broken lines to the position shown just below the surface of the liquid. This causes the liquid 27 immediately above the annulus to rise and contact the rim 21. The annulus is then returned down to its initial position and the raised liquid flows back to its original level, this flow being away from the walls of the hemisphere. Thus the walls 25 of the hemisphere can be left free of liquid and the rim 21 only is coated.

Figure 3:
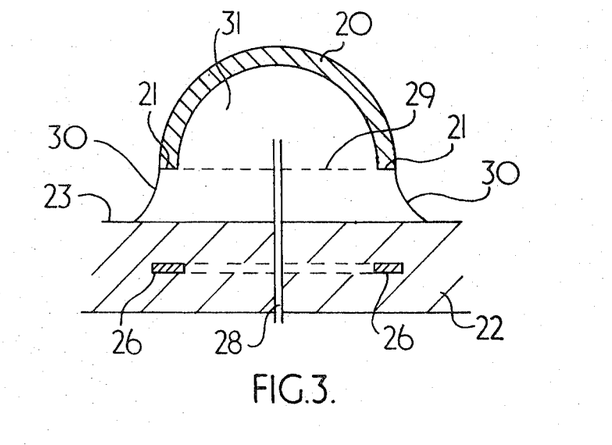
FIG. 3 is a similar representation showing the effect of introducing a vent pipe.

In FIG. 3 the above-described venting technique is illustrated. Again it is desired to coat the rim 21 of hemisphere 20 with liquid 22. A vent pipe 28 is introduced from the atmosphere through liquid 22 into the air space 31 inside the hemisphere. When the annulus 22 has been raised to bring the liquid into contact with rim 21, it is found that, in the absence of a vent pipe, a bubble 29 may tend to form across the mouth of the hemisphere in the position shown in broken lines. This bubble formation is undersirable since, when the bubble is broken, liquid will splash the inside walls of the hemisphere, and for certain applications this may not be wanted. However, the presence of vent pipe 28 prevents the formation of bubble 29 and, if any bubble formation takes place at all, it will be between the rim 21 and the general surface 23 of the liquid. Such a bubble is shown at 30. The bursting of this bubble is less likely to deposit undesirable liquid splashes on the article being coated.

Figure 4:
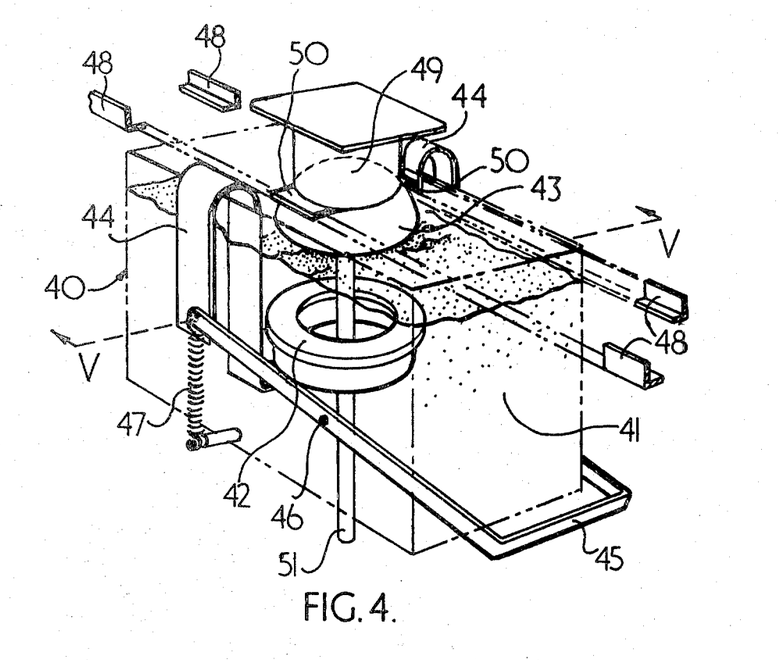
FIG. 4 is a perspective view with parts cut away of a typical coating apparatus showing a bath in broken lines containing a liquid, a lever and spring mechanism to lower and raise the annulus and means to position the article above the bath.
Figure 5:
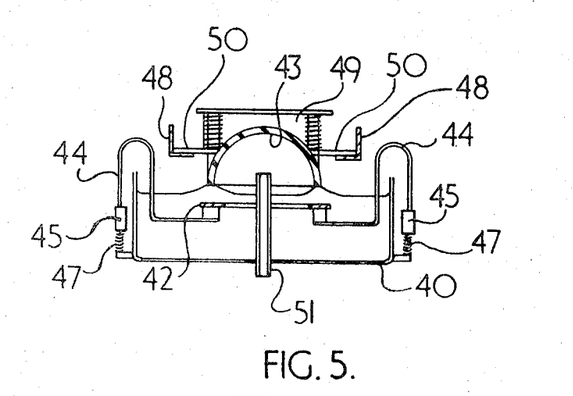
FIG. 5 is a sectional view on the line V—V of FIG. 4 showing an article at the moment of being coated.

FIG. 4 shows an apparatus of the invention, adapted to coat the rim of a hollow hemisphere with liquid, e.g. adhesive, and FIG. 5 shows a sectional view on the line V—V of FIG. 4. The apparatus comprises a rectangular bath 40 which contains the liquid 41. Inside the bath is positioned an annulus 42 of size and shape corresponding to the article to be coated, i.e. the rim of hollow hemisphere 43. The annulus 42 has two positions in the bath, between which it can be moved by a lever and spring arrangement. The annulus is connected via two U-shaped arms 44 to a lever 45 outside the bath. The lever is pivoted at 46 and its movement up or down is controlled by two springs 47 on opposite sides of the bath.

The means to position the hemisphere over the liquid in the bath comprises two L-shaped guide rails 48 running across the top of the bath. The hemisphere 43 is fitted into a jig 49, this jig having a pair of arms 50. These arms locate the jig on the guide rails and enable it to be slid across the top of the bath above the surface of the liquid.

In operation, therefore, a hemisphere 43 is fitted into jig 49 and the arms 50 of the jig are located on the guide rails 48 and slid to a central position above the bath so that the hemisphere is directly above annulus 42. Liquid to be applied to the rim of the hemisphere is maintained in the bath at a level so that the annulus in its rest position is just submerged. The annulus is depressed by pressing lever 45 so that springs 47 are compressed. Lever 45 is then released, the annulus then being returned upwards to its rest position by the return action of the springs. This upward movement of the annulus causes the liquid immediately above it to rise briefly above the general liquid surface level and thereby contact and coat the hemisphere all around its rim.

Clearly many different forms of lever arrangement can be used to achieve the same effect and the annulus can equally well be moved upwards from a rest position instead of downwards. Moreover, it will be apparent that the apparatus can be modified so that a number of hemispheres, or other articles, can be coated simultaneously.

The improved means of joining two rim-coated hemispherical half-shells that is afforded by the present invention is illustrated in stage-by-stage sequence in FIGS. 6 to 12.

Figure 6:
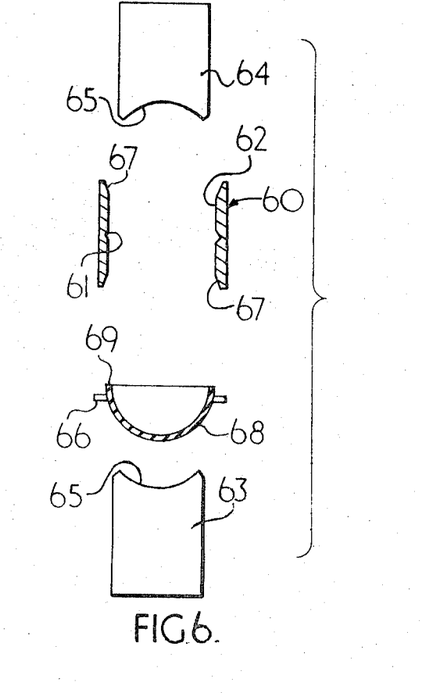
FIGS. 6 to 12 are diagrammatic representations of the various stages in the improved joining technique provided by the invention.

A cylindrical joining tube 60 is employed, this having an internal annular groove 61 running around the inner wall 62 of the tube, this groove being located about half-way down the length of the tube. Two plungers 63 and 64 are employed, one being positioned opposite each open end of the tube and each plunger being slidable towards and away from the tube. The end 65 of each plunger facing the tube is of arcuate form corresponding to a portion of the hemispheres to be joined. The apparatus also comprises a frame 66 having a centrally disposed circular aperture (not shown), this aperture being of diameter a little less than the diameter of the hemispheres to be joined. The joining tube is also of internal diameter slightly less than that of the hemispheres but the inner wall of the tube is cut away at each end to provide an angled 'lead-in' portion 67 to facilitate entry of the hemisphere into the tube.

Figure 7:
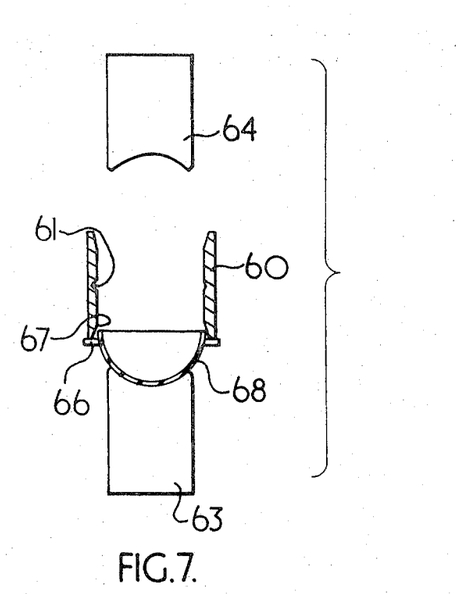
Figure 8:
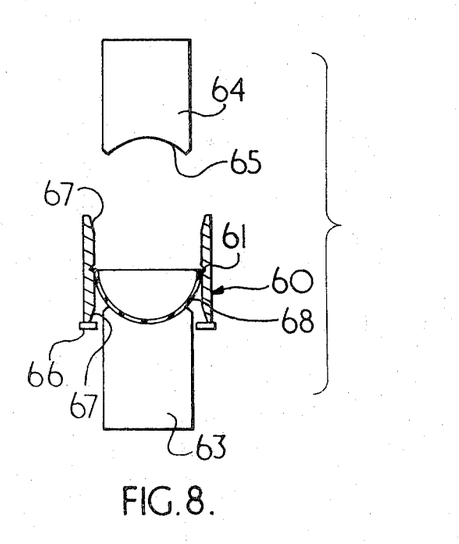

In operation a first hemisphere 68, which has previously been adhesively-coated around its rim 69 by the method of the invention, is fitted into carrying frame 66. The carrying frame is positioned between plunger 63 and the tube 60 as shown in FIG. 7, so that the pole of the hemisphere faces end 65 of plunger 63. Plunger 63 is then moved towards tube 60; arcuate end 65 of the plunger contacts the surface of the hemisphere 68 and pushes the hemisphere in its frame up to the open end of tube 60. Frame 66 then abuts on the end of tube 60 as shown in FIG. 7. The plunger 63 then pushes the hemisphere out of its frame and inside the tube until the hemisphere outer wall adjacent its rim locates in groove 61 (FIG. 8).

Figure 9:
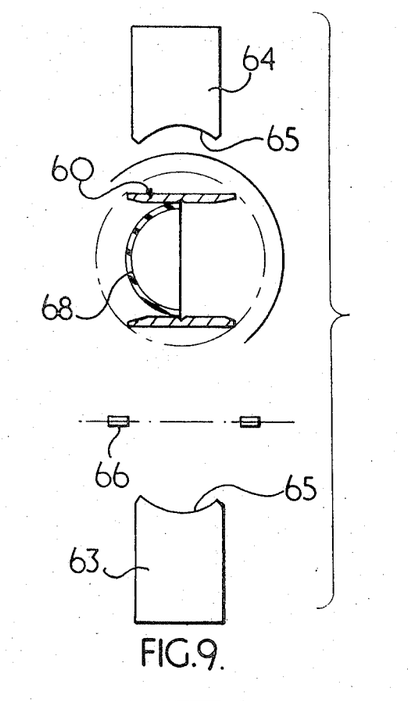

Plunger 63 and frame 66 are then moved away from tube 60 back to their starting positions. The joining tube is then rotated through 180° so that its other open end now faces plunger 62. FIG. 9 shows this rotation taking place.

Figure 10:
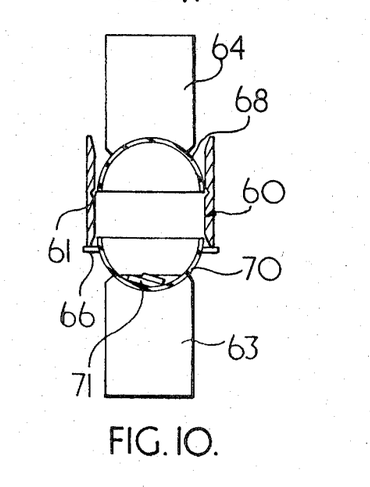

A second rim-coated hemisphere 70 is then fitted into frame 66 and is pushed into the tube 60 in the same manner as was hemisphere 68. Plunger 64 is moved into contact with hemisphere 68 as or before hemisphere 70 is pushed into the tube so that hemisphere 68 will not be dislodged when it is contacted by hemisphere 70. FIG. 10 shows the position where hemisphere 70 is just about to enter the tube. If desired this hemisphere may contain gas-generating chemicals 71 so that the two hemispheres, when joined together, can be pressurized by heating to effect the gas-forming reaction. (This effect is very useful if a tennis ball core is being formed).

Figure 11:
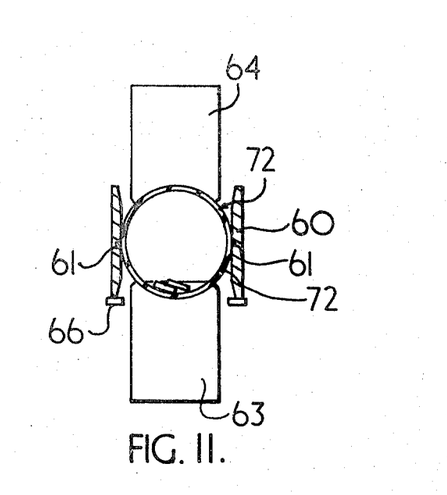

The actual joining together of the hemispheres is shown in FIG. 11 where hemisphere 70 has been pushed up to groove 61 and is pressed into rim-contact with hemisphere 68. Thus the two hemispheres are joined under pressure at their adhesive-coated rims to form a hollow sphere 72.

Figure 12:
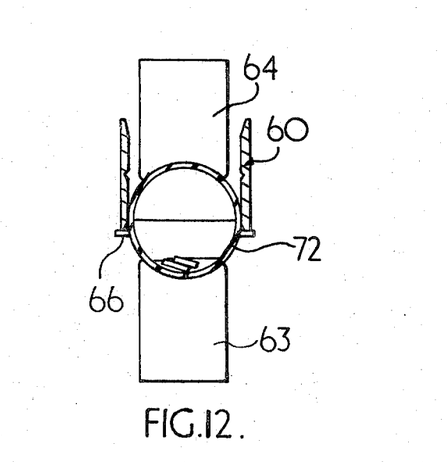

FIG. 12 shows the start of the final stage, i.e. ejection of the joined hemispheres, e.g. tennis ball core 72, from tube 60. Plunger 63 is withdrawn and plunger 64 pushes core 72 first into a push fit in frame 66 and then out of the tube completely.

It will be appreciated that this general joining technique may be varied in a number of ways. For example, instead of rotating tube 60 through 180°, one hemisphere could be pushed into the tube from each end, i.e. one hemisphere by plunger 63 at one end and the other hemisphere at the other end by plunger 64.

In an alternative method of making a pressurized hollow article, gas under pressure can be introduced between the two half-shells before they are joined together. Thus, for example, gas under pressure may be introduced between the two half-shells just prior to their joining, the gas entering through a suitable duct in the joining tube.

The improved method of liquid application provided by the invention enables the mass-production of articles such as tennis or squash ball cores to be more conveniently mechanized. For example a continuous production line can be adapted to handle the continuous solutioning and assembly of a large number of half-shells. Thus, the half-shells can be loaded into carrying slats which take, for example, 10, 12 or more half-shells at a time. The loaded slats are then fed in turn to the solutioning bath where the half-shells are positioned rim downwards above a corresponding row of annuli beneath the surface of the adhesive. Thus the rims of the half-shells of each slat can be solutioned simultaneously and the half-shells can then be passed down the line to receive the further necessary treatments including the final simultaneous assembly stage of a number of spheres.

Having now described my invention, what I claim is:

1. A method of coating selected areas of an article with a liquid, which comprises the steps of positioning said article above the surface of said liquid, positioning a tool beneath the surface of said liquid, in correspondence with said article, said tool being shaped to correspond with the selected areas of said article, raising said tool so that it does not break through the surface of said liquid but causes the liquid above it to rise and thereby contact the selected areas of the article.

2. A method according to claim 1, in which said liquid is contained in a bath and is maintained at a constant level in said bath by means of a weir and pumping means to return to said bath excess liquid carried over said weir.

3. A method according to claim 1, in which said tool is depressed from a rest position just beneath the surface of said liquid and is then raised to return to said rest position, thereby causing the liquid above it to rise into contact with said article.

4. A method according to claim 1, in which said tool is raised from its rest position in order to cause the liquid above it to rise, and is then returned down to said rest position.

5. A method according to claim 1, in which said liquid is an adhesive.

6. A method according to claim 1, in which the air volume enclosed by said article and said liquid when they come into contact is vented by the introduction of a vent pipe from said air volume to the atmosphere.

7. A method according to claim 1, in which the article is a hollow hemisphere, the selected area to be coated is the rim of said hemisphere, the hemisphere is positioned pole uppermost above said liquid and said tool is an annulus.

8. A method according to claim 7, in which said hemisphere is a playball half-shell, two hemispheres are rim-coated with adhesive and are then joined together around their rims to form the playball shell.

9. A method according to claim 8, in which said two rim-coated hemispheres are joined together by fitting the hemispheres into opposite ends of a tube so that their adhesive-coated rims are facing, and then pressing the hemispheres into rim-abutment with each other.

* * * * *